United States Patent
Yamada et al.

(10) Patent No.: US 9,014,088 B2
(45) Date of Patent: Apr. 21, 2015

(54) SYSTEM AND METHOD FOR DELIVERING DATA IN AN INTERMITTENT COMMUNICATION ENVIRONMENT

(75) Inventors: Hiroshi Yamada, Fukuoka (JP); Yasuo Inoue, Fukuoka (JP); Shinichi Matsumoto, Kanzake (JP); Masayoshi Kamada, Dazaifu (JP)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 13/432,561

(22) Filed: Mar. 28, 2012

(65) Prior Publication Data

US 2012/0307725 A1    Dec. 6, 2012

(30) Foreign Application Priority Data

May 31, 2011    (JP) ................. 2011-122660

(51) Int. Cl.
  *H04W 4/00*    (2009.01)
  *H04W 40/02*    (2009.01)
  *H04W 40/24*    (2009.01)

(52) U.S. Cl.
  CPC .......... *H04W 40/026* (2013.01); *H04W 40/246* (2013.01)
  USPC ........... 370/328; 370/254; 370/338; 370/401; 709/218; 709/223; 709/240; 455/450; 455/451; 455/452.2

(58) Field of Classification Search
  None
  See application file for complete search history.

(56) References Cited

U.S. PATENT DOCUMENTS

| | | | | |
|---|---|---|---|---|
| 7,236,388 | B2 * | 6/2007 | Hosoi et al. ................... | 365/148 |
| 7,457,834 | B2 * | 11/2008 | Jung et al. ............................ | 1/1 |
| 7,536,388 | B2 * | 5/2009 | Jung et al. ............................ | 1/1 |
| 7,941,188 | B2 * | 5/2011 | Jung et al. .................. | 455/562.1 |
| 8,139,504 | B2 * | 3/2012 | Mankins et al. ............... | 370/254 |
| 8,149,716 | B2 * | 4/2012 | Ramanathan et al. ........ | 370/238 |
| 2003/0063585 | A1 * | 4/2003 | Younis et al. ................. | 370/331 |

(Continued)

FOREIGN PATENT DOCUMENTS

| | | |
|---|---|---|
| JP | 2003-281671 | 10/2003 |
| JP | 2006-295956 | 10/2006 |

(Continued)

OTHER PUBLICATIONS

Start Video "Open Lecture" The Second lecture on Jun. 18, 2005; Person In Charge: Osamu Nakamura; SFC Open Lecture 2005.

(Continued)

*Primary Examiner* — Ian N Moore
*Assistant Examiner* — Latresa McCallum
(74) *Attorney, Agent, or Firm* — Staas & Halsey LLP

(57) ABSTRACT

Mobile nodes are allowed to move around within an intermittent communication environment. A mobile node wirelessly communicates with an access node when approaching the access node, and stores data. The access node stores an action history for each mobile node, and generates a forwarder list in association with a destination node, based on action histories of the mobile nodes. The forwarder list stores one or more identifies each identifying a first mobile node in the order of an arrival probability indicating a probability that the first mobile node succeeds in delivering the data to the destination node. The access node selects second mobile nodes that are to carry the data to the destination node, based on the forwarder list, and transfers the data to one of the second mobile nodes when a communication link is established between the access node and the one of the second mobile nodes.

8 Claims, 15 Drawing Sheets

(56) References Cited

U.S. PATENT DOCUMENTS

| | | | |
|---|---|---|---|
| 2009/0073921 A1* | 3/2009 | Ji et al. | 370/328 |
| 2010/0103851 A1* | 4/2010 | Chintada et al. | 370/312 |
| 2010/0265951 A1* | 10/2010 | Fujita et al. | 370/392 |

FOREIGN PATENT DOCUMENTS

| | | |
|---|---|---|
| JP | 2008-028756 | 2/2008 |
| JP | 2009-55511 | 3/2009 |
| JP | 2009-294814 | 12/2009 |

OTHER PUBLICATIONS

Performance Evaluation of Priority Control System; 1 page, 2010.
Mac Protocol; WebLab.ota; http://d.hatena.ne.jp/n_euler666/20070815/1187103988; Aug. 15, 2007.
Japanese Office Action dated Oct. 7, 2014 in corresponding Japanese Patent Application No. 2011-122660.
Japanese Decision of Refusal dated Feb. 24, 2015 in Japanese Application No. 2011-122660.

* cited by examiner

▢ : MOBILE NODE

◯ : FIXED NODE

SRC : SOURCE NODE

DST : DESTINATION NODE

FIG. 6

MANAGEMENT DATA OF FORWARDER

| ACTION HISTORY (NETWORK ACCESS HISTORY) | | | |
|---|---|---|---|
| ACCESSED NETWORK IDENTIFIER | LAN-A (ACCESSED ACCESS-POINT IDENTIFIER, ACCESS-POINT CONFIGURATION INFORMATION ITEM) | | |
| | LAST ACCESS | ACCESS START TIME | NOVEMBER 10, 2010 10:25:10 |
| | | ACCESS FINISH TIME | NOVEMBER 10, 2010 12:30:30 |
| | | NODE-e SENSOR INFORMATION ITEM | |
| | FIRST PREVIOUS | ACCESS START TIME | NOVEMBER 9, 2010 10:22:30 |
| | | ACCESS FINISH TIME | NOVEMBER 9, 2010 12:27:10 |
| | | NODE-e SENSOR INFORMATION ITEM | |
| | ⋮ | | |
| | N-TH PREVIOUS | ACCESS START TIME | NOVEMBER 7, 2010 10:31:15 |
| | | ACCESS FINISH TIME | NOVEMBER 7, 2010 12:31:10 |
| | | NODE-e SENSOR INFORMATION ITEM | |
| ACCESSED NETWORK IDENTIFIER | LAN-B (ACCESSED ACCESS-POINT IDENTIFIER, ACCESS-POINT CONFIGURATION INFORMATION ITEM) | | |
| | LAST ACCESS | ACCESS START TIME | OCTOBER 10, 2010 20:25:10 |
| | | ACCESS FINISH TIME | OCTOBER 10, 2010 20:30:30 |
| | | NODE-f SENSOR INFORMATION ITEM | |
| | FIRST PREVIOUS | ACCESS START TIME | NOVEMBER 11, 2010 20:22:30 |
| | | ACCESS FINISH TIME | NOVEMBER 11, 2010 20:27:10 |
| | | NODE-f SENSOR INFORMATION ITEM | |

FIG. 7

MANAGEMENT DATA OF ACCESS POINT

| FORWARDER IDENTIFIER | FORWARDER-A | | |
|---|---|---|---|
| ACCESSED NETWORK | LAN-A | | |
| | TOTAL ACCESS TIME | 10 HOURS 30 MINUTES | |
| | THE NUMBER OF ACCESSES | 10 TIMES | |
| | ACCESS START TIME | NOVEMBER 10, 2010 | 10:25:10 |
| | ACCESS FINISH TIME | NOVEMBER 10, 2010 | 12:30:30 |
| | ... | | |
| | ACCESS START TIME | NOVEMBER 10, 2010 | 10:25:10 |
| | ACCESS FINISH TIME | NOVEMBER 10, 2010 | 12:30:30 |
| | NETWORK CONFIGURATION INFORMATION ITEM | | |
| | NODE-a | 172.16.1.1 | |
| | NODE-b | 172.16.1.2 | |
| | ... | | |
| ACCESSED NETWORK | LAN-B | | |
| | NETWORK CONFIGURATION INFORMATION ITEM | | |
| | ... | | |
| FORWARDER IDENTIFIER | FORWARDER-A | | |
| ACCESSED NETWORK | LAN-A | | |
| | NETWORK CONFIGURATION INFORMATION ITEM | | |
| | ... | | |

FORWARDER LIST OF ACCESS POINT

| DESTINATION | LAN-A | |
|---|---|---|
| NO.1 | FORWARDER-A | |
| NO.2 | FORWARDER-B | |
| NO.3 | FORWARDER-X | |
| DESTINATION | LAN-B | |
| NO.1 | FORWARDER-Z | |
| NO.2 | FORWARDER-Y | |
| ... | | |
| DESTINATION | LAN-C | |
| NO.1 | FORWARDER-B | |
| NO.2 | FORWARDER-A | |
| ... | | |
| DESTINATION | LAN-D | |
| NO.1 | FORWARDER-X | |
| NO.2 | FORWARDER-Y | |

SYSTEM AND METHOD FOR DELIVERING DATA IN AN INTERMITTENT COMMUNICATION ENVIRONMENT

CROSS-REFERENCE TO RELATED APPLICATION

This application is based upon and claims the benefit of priority of the prior Japanese Patent Application No. 2011-122660, filed on May 31, 2011, the entire contents of which are incorporated herein by reference.

FIELD

The embodiment discussed herein is related to a system and method for delivering data in an intermittent communication environment.

BACKGROUND

Recently, remarkable technical progresses have been made in sensors. The sensor market has been rapidly expanding to not only industrial fields and consumer fields but also new fields such as medical fields or environmental fields. Furthermore, because of development of sensor network techniques for connecting sensors to networks, environments in which sensors are connected to networks have being established.

By connecting sensors to networks, sensor information items provided by the sensors may be utilized in almost real time, and collection of a large number of sensor information items may be facilitated, thereby allowing high-level information items, such as contextual information items, to be generated from the multiple sensor information items. Thus, there is a historical background in which new services that do not exist as conventional services may be generated.

Services that have been proposed as examples of services in such environments are as follows: "a service in which collecting and aggregating, by means of sensors, information items concerning states of use of electric power in homes or in offices allows unnecessary electric power to be visualized so as to support a reduction in the amount of emission of $CO_2$ or in power consumption"; and "an agricultural support service in which multiple sensors that collect sensor information items concerning temperature, humidity, luminance, or the like are installed in a farm so that the farm is visualized from the collected sensor information items".

However, in consideration of a situation in which a large number of sensors of various types will be placed in every part of the world in the future, it may be difficult to expect that all of the sensors are continuously connected to networks (the Internet). Accordingly, collection of sensor information items of sensors that are not necessarily continuously connected to networks is a significant issue in the case of forming sensor networks. Some techniques are considered as techniques for addressing this issue. Among the techniques, a delay/distribution-tolerant networking (DTN) technology is considered as a useful technique.

FIGS. 1, 2A, and 2B are schematic diagrams illustrating an example of a DTN technology. The DTN technology has been proposed as a communication scheme for realizing reliable data transfer even in a communication environment to which network technologies of the related art are not easily applicable, such an environment in which a large transmission delay occurs or an environment in which disconnection of communication frequently occurs. An overview of a DTN architecture is summarized in RFC4838. In the DTN technology, a communication environment in which a physical link does not necessarily exist at all times is supposed, and data is transferred in a store-and-forward method.

FIG. 1 is a schematic diagram illustrating an example of data transfer in a store-and-forward method. In an intermittent communication environment, physical lines are intermittently disconnected between network nodes (nodes A to D), such as routers, access points, user terminals, or servers. Accordingly, in a case of data transfer in the store-and-forward method, data to be transmitted is stored in each of nodes while physical lines are being disconnected, and, when the physical lines are connected between the nodes, an operation of transmitting all stored data is performed.

FIG. 2A is a schematic diagram illustrating an example of a protocol stack used in the Internet. In Internet architecture, as illustrated in FIG. 2A, connection between a transmission source and a transmission destination is established in an application layer. Furthermore, connection between routers that establish connection between the transmission source and the transmission destination is established in a network layer. Between the transmission source and the transmission destination between which connection is established in the application layer, data is relayed by the routers that are continuously connected via physical lines included in a physical layer. In relay devices such as the routers, transferring data in the network layer allows the transmission source and the transmission destination to communicate with each other.

FIG. 2B is a schematic diagram illustrating an example of a protocol stack used in a DTN network. In the DTN architecture, the store-and-forward method is realized using a new protocol layer that is called a bundle layer. Nodes (DTN hosts/DTN routers/DTN gateways) having the bundle layer, which are illustrated in FIG. 2B, are called DTN nodes. Further, the DTN routers and the DTN gateways are called forwarders. In the DTN architecture, an environment in which physical lines are intermittently disconnected is supposed. Accordingly, a forwarder finishes communication once in the bundle layer, and temporarily stores transfer data in a storage area thereof. Then, when physical lines are connected, the forwarder transfers the transfer data, which is stored in the storage area, to a DTN node that is adjacent thereto.

The DTN technology has originally been researched as a communication scheme in interplanetary communication. However, at present, the DTN technology is also expected as a communication method usable in the case of disaster, a communication method usable in a region in which connection to the Internet is not able to be established, or a method that collects sensor information items of sensors or the like which are not connected to a typical network.

Techniques that have been proposed in the related art are as follows: a system that controls, via a network, a unit which measures an air pollution state; a system that allows a large amount of data to be transmitted between monitor devices of a sensor network; a low-power sensor node that has a high-sensitivity wireless function; and a sensor network for which setting is facilitated or whose operation is facilitated.

Japanese Laid-open Patent Publications No. 2003-281671, No. 2006-295956, No. 2008-28756, and No. 2009-294814 are examples of the related art.

SUMMARY

According to an aspect of the invention, a system includes a plurality of mobile nodes each allowed to move around within an intermittent communication environment, and a plurality of access nodes each connected to one of a plurality of networks. Each of the plurality of mobile nodes wirelessly communicates with any node included in both the plurality of access nodes and the plurality of mobile nodes when the each mobile node approaches the any node, and stores communication data to be delivered to a destination node included in one of the plurality of networks. Each of the plurality of access nodes stores an action history in association with each of the plurality of mobile nodes, and generates a forwarder list in association with the destination node, based on action histories of the plurality of mobile nodes. The forwarder list stores one or more forwarder identifiers each identifying a first mobile node, in the order of an arrival probability indicating a probability that the first mobile node succeeds in delivering the communication data to the destination node. The each access node selects one or more second mobile nodes that are to carry the communication data to the destination node, based on the forwarder list, and transfers the communication data to one of the one or more second mobile nodes when a communication link is established between the each access node and the one of the one or more second mobile nodes so that the communication data is delivered to the destination node via the one of the one or more second mobile nodes.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 6 is a diagram illustrating an example of management data held by a mobile node, according to an embodiment;

FIG. 7 is a diagram illustrating an example of management data held by an access node of a sensor network or global network, according to an embodiment;

DESCRIPTION OF EMBODIMENT

As illustrated above, although an architecture for realizing store-and-forward type communication has already been proposed, routing algorisms therefore are still under consideration by various research institutes.

As for effective data transfer (quick data transfer with reliability without waste) in the DTN technology, which of routing schemes is to be selected is a significant issue to be addressed. For example, an epidemic routing scheme and a message ferry routing scheme have been proposed as the routing schemes.

FIGS. 3A to 3E are schematic diagrams illustrating an example of an epidemic routing scheme. As illustrated in FIGS. 3A to 3E, the epidemic routing scheme is a scheme in which individual DTN nodes move at random, and in which, when physical lines are connected to DTN nodes, a copy of data is distributed to all of the DTN nodes to which the physical lines are connected.

Figure 3A:
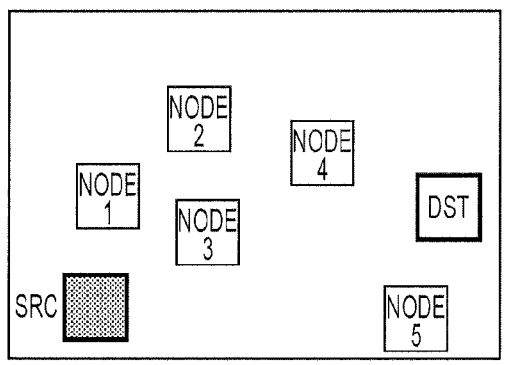
FIGS. 3A to 3E are schematic diagrams illustrating an example of an epidemic routing scheme.
Figure 3B:
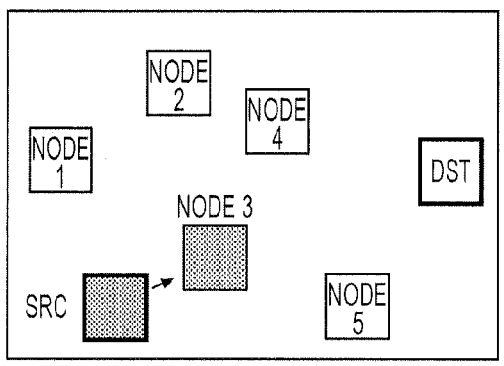
Figure 3C:
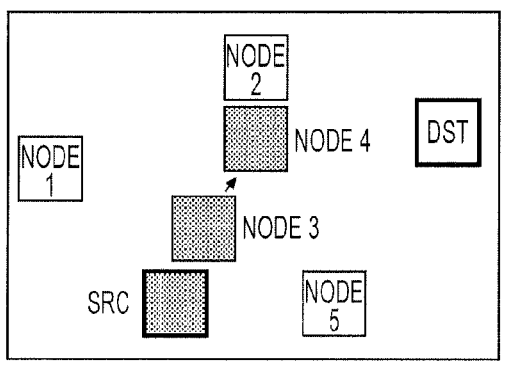
Figure 3D:
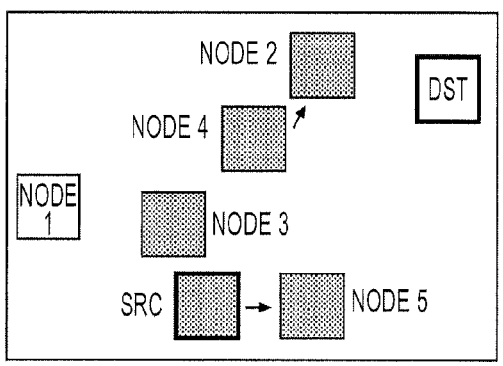
Figure 3E:
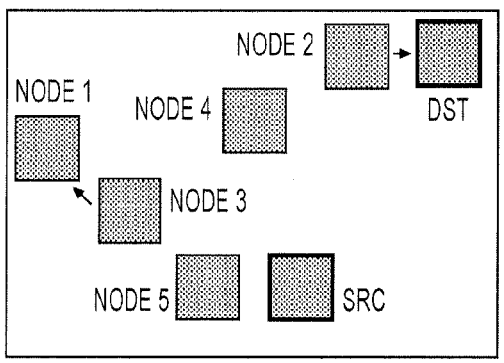

In FIGS. 3A to 3E, all nodes are mobile nodes. Referring to FIG. 3A, it is supposed that data is transmitted from a transmission source node SRC. Referring to FIG. 3A, a physical line is not connected to any one of the nodes. Referring to FIG. 3B, because a node 3 moves and, consequently, approaches the transmission source node SRC, a physical line is connected between the transmission source node SRC and the node 3. Accordingly, the transmission source node SRC transfers the data to the node 3. Referring to FIG. 3C, because the node 3 moves and, consequently, approaches a node 4, a physical line is connected between the node 3 and the node 4. Accordingly, the node 3 transfers the data to the node 4. Referring to FIG. 3D, because the node 4 moves and, consequently, approaches a node 2, a physical line is connected between the node 4 and the node 2. Accordingly, the node 4 transfers the data to the node 2. Furthermore, because the transmission source node SRC moves and, consequently, approaches a node 5, a physical line is connected between the transmission source node SRC and the node 5. Accordingly, the transmission source node SRC transfers the data to the node 5. Referring to FIG. 3E, because the node 2 moves and, consequently, approaches a transmission destination node DST, a physical line is connected between the node 2 and the transmission destination node DST. Accordingly, the node 2 transfers the data to the transmission destination node DST. Furthermore, because the node 3 moves and, consequently, approaches the node 1, a physical line is connected between the node 3 and the node 1. Accordingly, the node 3 transfers data to the node 1. Thus, transfer of the data from the transmission source node SRC to the transmission destination node DST finishes.

As described above, each of nodes moves and, consequently, the node transmits data to all nodes serving as partners to which physical lines are connected. Accordingly, data is transferred along paths other than the path from a transmission source node to a transmission destination node so that the transferred data is stored in each of the nodes.

Figure 4A:
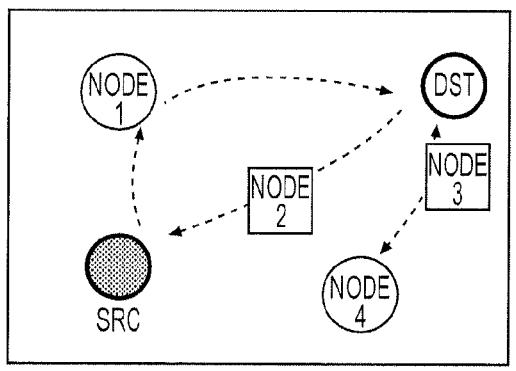
FIGS. 4A to 4C are schematic diagrams illustrating an example of a message ferry scheme.
Figure 4B:
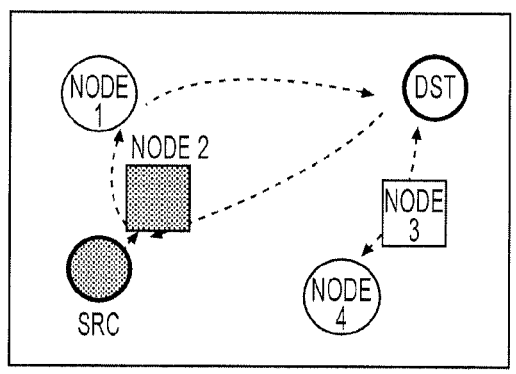
Figure 4C:
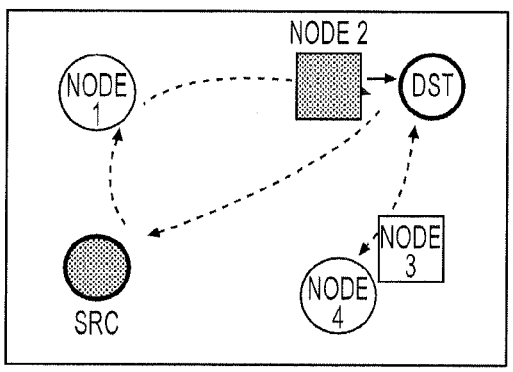

FIGS. 4A to 4C are schematic diagrams illustrating an example of a message ferry scheme. As illustrated in FIGS. 4A to 4C, the message ferry routing scheme is a scheme in which data is exchanged among a set of fixed nodes using a mobile node (also called "a ferry") that makes the rounds of the set of fixed nodes. As illustrated in FIGS. 4A to 4C, in this case, fixed nodes and a mobile node exist. The mobile node regularly makes the rounds of the same route. As illustrated in FIG. 4A, in a case of transferring data from a transmission source node SRC, a node 2 serves as the mobile node. When the node 2 approaches the transmission source node SRC in the case of delivering data among a set of fixed nodes, a physical line is connected between the node 2 and the transmission source node SRC. As illustrated in FIG. 4B, when the node 2 approaches the transmission source node SRC and a physical line is connected between the node 2 and the transmission source node SRC, the transmission source node SRC transfers data to the node 2. As a result, as illustrated in FIG. 4C, when the node 2 approaches the transmission destination node DST and a physical line is connected between the node 2 and the transmission destination node DST, the node 2 transfers the data to the transmission destination node DST. Thus, delivery of the data from the transmission source node SRC to the transmission destination node DST finishes.

For example, a fixed route bus or a railroad train may serve as a mobile node in the message ferry routing scheme.

In the epidemic routing scheme, data is copied into all nodes. Accordingly, the traffic on a network increases, causing a problem that the amount of data accumulated in each of the nodes increases.

Furthermore, regarding a message ferry routing scheme, existence of a mobile node is a prerequisite, causing a problem that, the message ferry routing scheme is difficult to apply to a case in which no mobile node exists, that is, a case in which communication is performed by a node existing outside a region in which a mobile node is making the rounds of a set of fixed nodes.

In an embodiment given below, histories of mobile nodes that accessed access points of isolated local access networks (LANs) or the like between which no physical line is connected are stored and shared. Mobile nodes that are to serve as mediators between different access points are selected based on the stored histories of mobile nodes, and packets are transferred using the selected mobile nodes. Hereinafter, an access point will be also expressed as "an access node".

Figure 5:
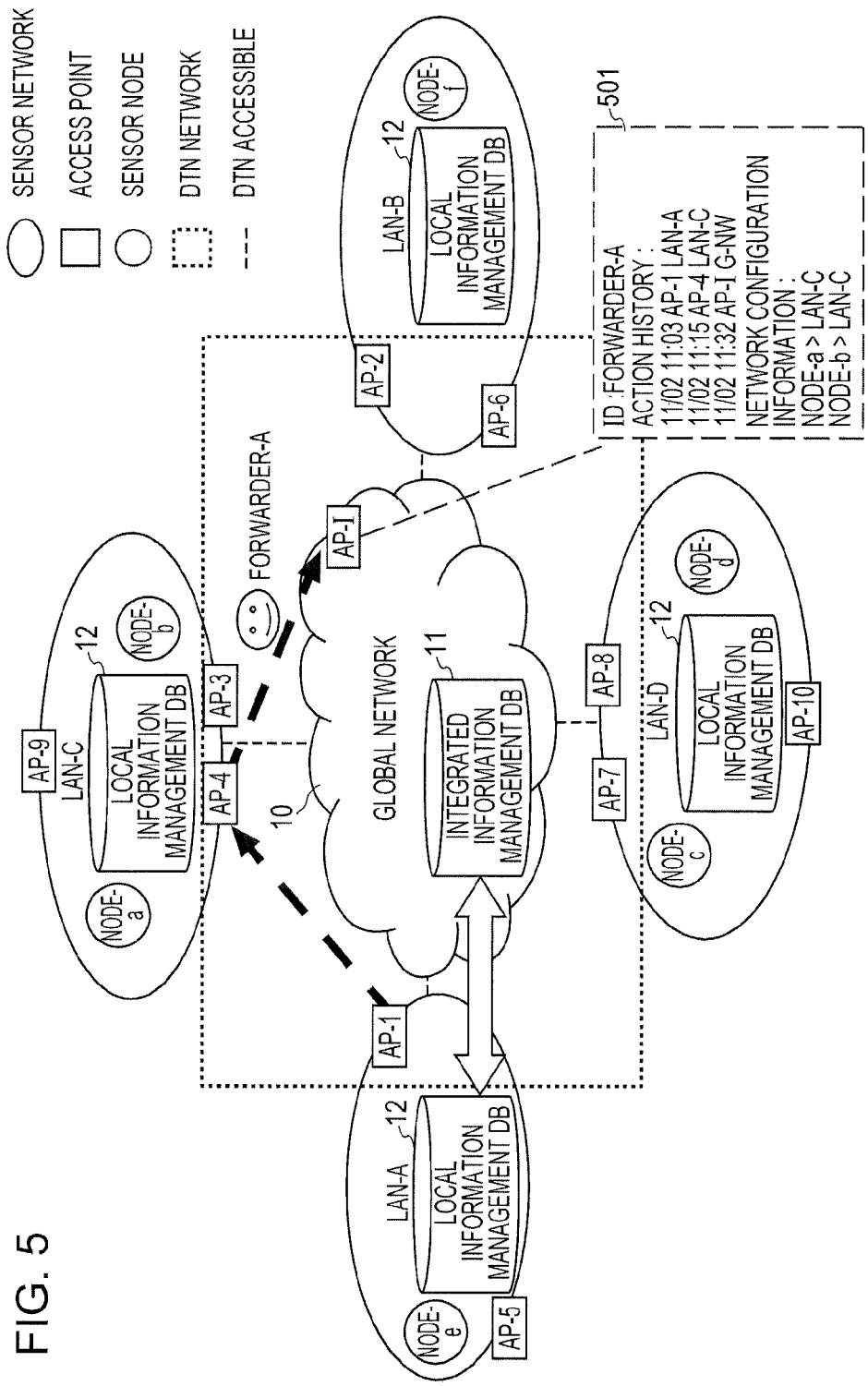
FIG. 5 is a diagram illustrating an example of a data delivery system, according to an embodiment.

FIG. 5 is a diagram illustrating an example of a data delivery system, according to an embodiment. FIG. 5 illustrates a data delivery system operated in an intermittent communication environment that includes, as sensor networks, LANs LAN-A to LAN-D that are not connected to a global network 10 (for example, the Internet), and includes a DTN network.

Figure 2A:
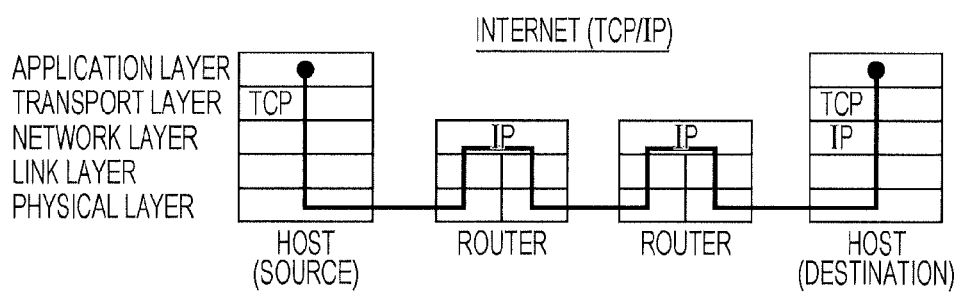
FIG. 2A is a schematic diagram illustrating an example of a protocol stack used in the Internet.
Figure 2B:
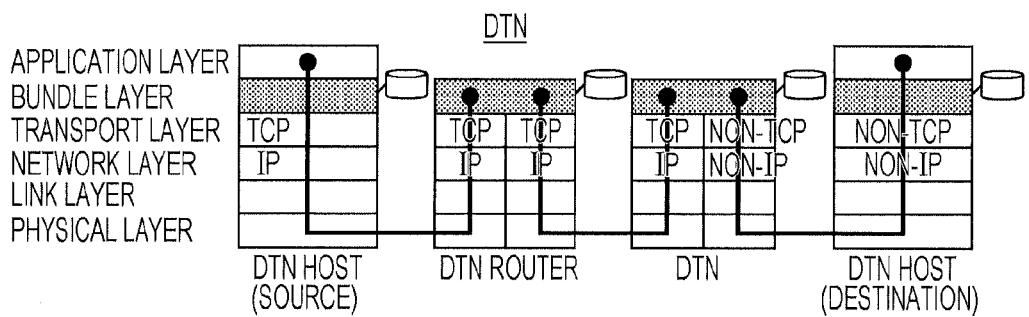
FIG. 2B is a schematic diagram illustrating an example of a protocol stack used in a DTN network.

Here, it is assumed that a transport layer in the DTN network is realized using an arbitrary wireless access layer, and that the DTN-gateways have a protocol stack, for example, as illustrated in FIG. 2B. In this case, at the boundary between the sensor networks LAN-A to LAN-D and the global network 10 (for example, the Internet), there exist wireless LAN access points (access nodes) AP-1 to AP-10 that are fixed in the sensor networks LAN-A to LAN-D and have a function of serving as DTN-gateways that establish communication links in the intermittent communication environment (the DTN network).

The global network 10 may include an integrated information management database (DB) 11 that integrates and manages sensor information items which have been collected by sensor node NODE-a to NODE-f belonging to the sensor networks LAN-A to LAN-D. The integrated information management DB 11 holds information items that are used to store or transfer data within the DTN network, such as network configuration information items concerning the configurations of the sensor networks LAN-A to LAN-D, action histories of forwarders serving as mobile nodes, and attribute information items concerning the attributes of the forwarders.

Each of the forwarders serves as a mobile node and moves around in the DTN network so as to approach the wireless LAN access points (access nodes) AP-1 to AP-10 fixed in the sensor networks LAN-A to LAN-D. Each of the forwarders (mobile nodes) has a function of recording, in a management database 23 (which will be described later) included in the each forwarder, network configuration information items concerning the configurations of the sensor networks LAN-A to LAN-D by which the each forwarder stopped in the past, as the action history of the each forwarder. The network configuration information items includes, for example, access-point configuration information items concerning the configurations of access points accessed by the each forwarder, network configuration information items concerning the configurations of networks accessed by the each forwarder, and information items concerning nodes in the networks, such as sensor nodes, that are communicably coupled to the each forwarder.

Each of the wireless LAN access points AP-1 to AP-10 has a function of reading the action histories of forwarders from the forwarders, and of recording the action histories in a local information management DB 12 thereof.

Each of the wireless LAN access points AP-1 to AP-10 further has a function of extracting a forwarder list indicating forwarders each having a higher arrival probability of delivering a message to a destination node, from the action histories recorded in the local information management DB 12, and transferring the extracted forwarder list together with communication data to the forwarders. Here, an arrival probability indicates a probability that a message (or communication data) arrives at (or is delivered to) a destination node.

The forwarders and the wireless LAN access points AP-1 to AP-10 wirelessly communicate with each other. The forwarders are at all times in a state capable of establishing a communication link with an access point so that the forwarder starts communication upon entering wireless coverage areas of the wireless LAN access points AP-1 to AP-10.

FIG. 6 is a diagram illustrating an example of management data held by a mobile node, according to an embodiment. Each forwarder (mobile node) holds the action history thereof. Information items that are held as the action history are, for example, as follows: an accessed network identifier identifying a network that the forwarder accessed (e.g., the sensor network LAN-A); an access history indicating a history of accesses made to the network (for example, access start time/finish time); an accessed access-point identifier identifying an access point that was accessed by the forwarder; an accommodated-sensor-terminal information item (configuration information of an accessed network, e.g., an IP address); and an access-point configuration information item.

FIG. 7 is a diagram illustrating an example of management data held by an access node of a sensor network or global network, according to an embodiment. For example, an access point (an access node) may hold, as management data, an action history of a forwarder in association with a forwarder identifier. The action history may include, for example, the following information items: an accessed network identifier identifying a network that was accessed by the forwarder (e.g., the sensor network LAN-A); a total access time indicating a cumulative time period during which the forwarder was accessing the network; the number of accesses made to the network; a history of accesses made to the network (access start time/finish time); an accommodated-sensor-terminal information item (an accessed network configuration information item, e.g., an IP address); and an access point configuration information item. Further, the access point may hold a forwarder list in association with each of destination nodes where the forwarder list indicating forwarders each having a higher arrival probability where an arrival probability indicates a probability that the intended message arrives at a destination node.

The arrival probability may be obtained, for example, by calculating, from past actual results, a probability that communication data arrive at a destination node in the case where the forwarder receives the communication data within a fixed time period. For example, the arrival probability is calculated using the following equation: (the arrival probability)=(the number of times data was transferred to a destination node during a fixed time period)/(the number of times data was transferred during the fixed time period). Here, the phrase "(the number of times data was transferred to a destination node during a fixed time period)" refers to the number of times the forwarder succeeded in transferring, during the fixed time period, received communication data to an access point of a wireless LAN to which the destination node is connected. The phrase "(the number of times data was transferred during the fixed time period)" refers to the number of times the forwarder received communication data during the fixed time period. When the forwarder receives the communication data, it is not certain that the forwarder succeeds in transferring the received communication data to the wireless LAN to which the transmission destination is connected. Accordingly, in the above-mentioned equation, the denominator is typically larger than the numerator.

For example, when the arrival probability is equal to or larger than a threshold of 0.5, it is determined that the arrival probability is high. The threshold is used to adjust the number of forwarders that transfer communication data. When the threshold is reduced, the scheme according to the embodiment becomes analogous to the epidemic routing scheme for typical DTN communication.

However, in some cases, there exist no forwarders having high arrival probabilities. Accordingly, the threshold is adjusted, in some cases, so that forwarders having low arrival probabilities are allowed to be used for transferring communication data. The threshold may be determined by a network administrator, a user, or the like in accordance with the states of forwarders included in a network or in accordance with the contents of communication data that is to be transferred.

When the number of entries in the forwarder list is few, the epidemic routing scheme or the message ferry routing scheme may be used. The forwarder list held by each access point may be configured as a list including fixed values that are set in advance. However, supposing that the arrival probabilities are updated in accordance with actual results of DTN communication, when DTN communication has not been performed, i.e., in an initial operating state, actual results (an effective forwarder list) of communication performed by each of the forwarders may be obtained by performing DTN communication using the epidemic routing scheme or the message ferry routing scheme, which are typical DTN communication schemes.

As described above, network configuration information items concerning the configurations of networks that are not physically linked each other are obtained, and forwarders having high arrival probabilities of communication data are selected in accordance with a transmission destination within a DTN network.

Here, the above network configuration information items concerning the configurations of networks that are not physically linked may be obtained, for example, by following a procedure given below.

Returning to FIG. 5, a forwarder-A passes by the neighborhood of the access point AP-4 included in the sensor network LAN-C, obtains the sensor information items provided by sensors included in the sensor network LAN-C and the network configuration information item concerning the network configuration of the sensor network LAN-C, and holds an access record of accesses made to the sensor network LAN-C as an action history.

The forwarder-A passes by the neighborhood of an access point AP-I of the global network 10, thereby synchronizing the action history of the forwarder-A and the network configuration information item with the integrated information management DB 11. Reference numeral 501 indicates an example of the action history of the forwarder-A and the network configuration information item. Accordingly, the network configuration information item concerning the configuration of the sensor network LAN-C and the action history of the forwarder-A are stored in integrated information management DB 11. In this way, the synchronization between the integrated information management DB 11 and the local information management DB 12 of the sensor network LAN-C may be performed.

Similarly, regarding the sensor networks LAN-A, LAN-B, and LAN-D and the global network 10, via forwarders that have passed by the neighborhood thereof, the synchronization for the network configuration information items and the action histories of the individual forwarders is performed between the integrated information management DB 11 and the local information management DB 12 of each of the sensor networks LAN-A, LAN-B, and LAN-D.

The network configuration information items concerning the configurations of the individual sensor networks and the action histories of the individual forwarders, which are stored in the integrated information management DB 11, are automatically or manually distributed by the access point AP-I included in the global network 10, to the local information managements DB 12 of the individual sensor networks. Thus, the network configuration information items concerning the configurations of the individual sensor networks and the action histories of the individual forwarders may be shared.

As described above, the network configuration items concerning the configurations of networks that are not physically linked each other may be obtained either in the global network 10 or in the individual sensor networks LAN-A to LAN-D.

Next, a configuration for selecting, in accordance with a transmission destination within a DTN network, forwarders having high arrival probabilities of communication data may be realized, for example, as follows.

Figure 8:
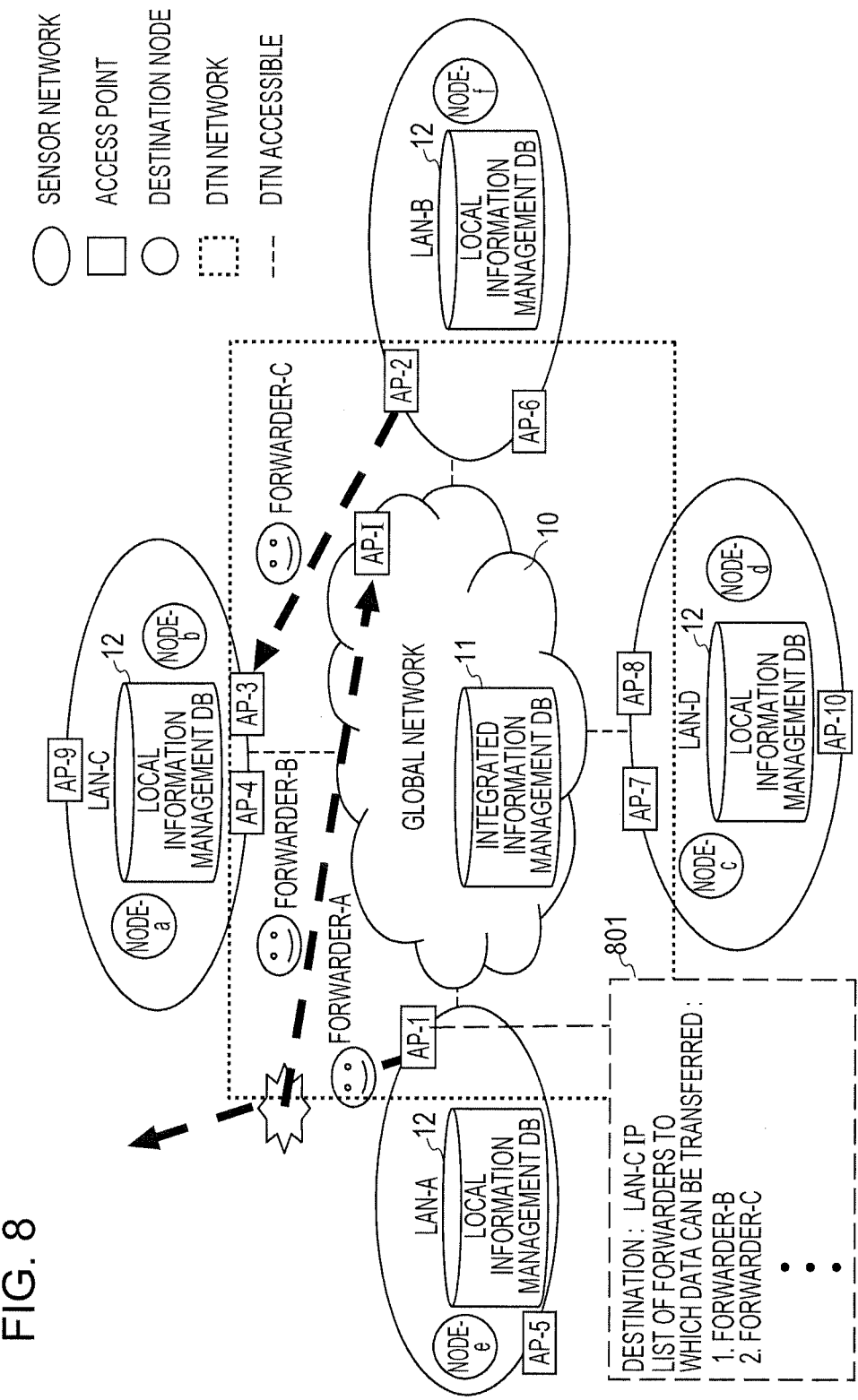
FIG. 8 is a diagram illustrating an example of a data flow when selecting a target mobile node, according to an embodiment.

FIG. 8 is a diagram illustrating an example of a data flow when selecting a mobile node, according to an embodiment. Note that, in FIG. 8, elements that are the same as elements illustrated in FIG. 5 are denoted by the same reference numerals. By transferring information items as described below, a forwarder selection scheme that addresses the issues of existing routing schemes in the DTN technique may be realized.

For example, it is assumed that a request for uploading sensor information items from the sensor network LAN-A to the global network 10 has occurred. In this case, "a forwarder list indicating forwarders having high arrival probabilities of delivering communication data to a transmission destination network" is extracted from the local information management DB 12 by the access point AP-1 that serves as a gateway of the sensor network LAN-A.

Here, the access point AP-1 generates a forwarder list, for example, in the following manner. The access point AP-1 holds the action histories of forwarders including the network identifiers identifying networks to which access points accessed by the forwarders belong. The access point AP-1 searches the action histories of forwarders, using the network identifiers, for the transmission destination network to which a transmission destination node belongs. That is, the access point AP-1 traces the network identifiers recorded in the action histories, and extracts forwarders that accessed networks having identifiers starting with the network identifier identifying the transmission destination network and ending with the network identifier identifying the network to which the access point AP-1 is connected. Then, the forwarder list is generated by calculating arrival probabilities from the number of accesses made by the forwarders to the transmission destination network, and by listing the forwarders in decreasing order of arrival probability. Reference numeral 801 indicates an example of a forwarder list generated by access node AP-1.

Figure 1:
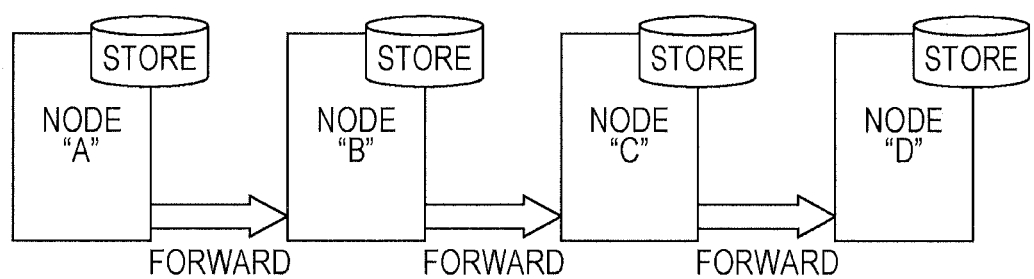
FIG. 1 is a schematic diagram illustrating an example of data transfer in a store-and-forward method.

The access point AP-1 of the sensor network LAN-A transfers the forwarder list, together with payload data (in other words, for example, communication data in the case of uploading sensor information items), to all forwarders listed in the generated forwarder list, for example, using the store-and-forward method as illustrated in FIG. 1.

When the forwarder-A to which the payload data has been transferred encounters a forwarder-B that is listed in the forwarder list, the forwarder-A transfers the forwarder list, together with the payload data held by the forwarder-A, to the forwarder-B. Repeating the above-described transfer of the payload data and the forwarding list allows increasing the efficiency with which communication data (or payload data) arrives at the transmission destination network.

In the above-described manner, forwarders having high arrival probabilities of delivering communication data from each of the sensor networks to the global network 10 are selected so that sensor information items collected in arbitrary sensor networks are integrated into the integrated information management DB 11 of the global network 10. This allows realizing DTN communication in which communication data is efficiently delivered to a transmission destination. Furthermore, communication from the global network 10 to the individual sensor networks LAN-A to LAN-D may be performed in a manner similar to the above-described manner.

A forwarder selection procedure may be performed by an access point, for example, as follows. An access point of a transmission source network to which a transmission source node belongs calculates, using a forwarder action estimating unit 34 which will be described later with reference to FIG. 14, arrival probabilities for an access point of a transmission destination network to which a transmission destination node belongs, based on the total access time periods during which forwarders were accessing the access point of the transmission destination network, the number of accesses made to the access point of the transmission destination network, and the histories of accesses made to the access point of the transmission destination network.

The access point of the transmission source network may select forwarders having high arrival probabilities with reference to a forwarder list for a destination of communication data, and transfer the communication data to the selected forwarders. Here, as a criterion for selecting forwarders having high arrival probabilities, for example, it is possible to select any of the top-three forwarders in the forwarder list, or to select forwarders having the arrival probability equal to or higher than the threshold of 0.5. When the number of entries in the forwarder list is few (equal to or smaller than a threshold), forwarders may be selected using a scheme of the related art, such as the epidemic routing scheme or the message ferry routing scheme.

Figure 9:
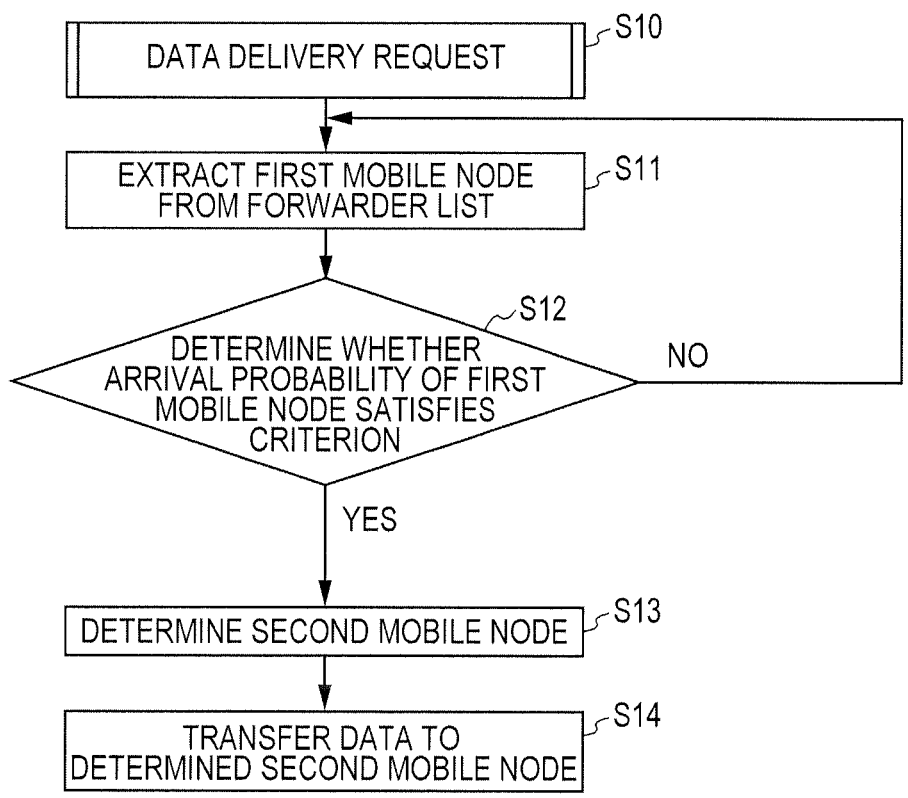
FIG. 9 is a diagram illustrating an example of an operational flowchart performed by an access node, according to an embodiment.

FIG. 9 is a diagram illustrating an example of an operational flowchart performed by an access node, according to an embodiment.

In operation S10, a request for delivering communication data to a destination node is inputted to the access node (access point).

In operation S11, the access node extracts data regarding a first mobile node (forwarder) from the forwarder list.

In operation S12, the access node determines whether or not the arrival probability of the extracted first mobile node (forwarder) satisfies a predetermined criterion. When it is determined that the arrival probability of the extracted first mobile node (forwarder) does not satisfy the predetermined criterion (NO in operation S12), the access node returns to operation S11, and extracts data regarding another first mobile node. When it is determined that the arrival probability of the extracted first mobile node satisfies the predetermined criterion (YES in operation S12), the access node determines the extracted first mobile node to be a second mobile node that is to carry the communication data to the destination node (in operation S13).

In operation S14, the access node transfers the communication data to the determined second mobile node.

Figure 10:
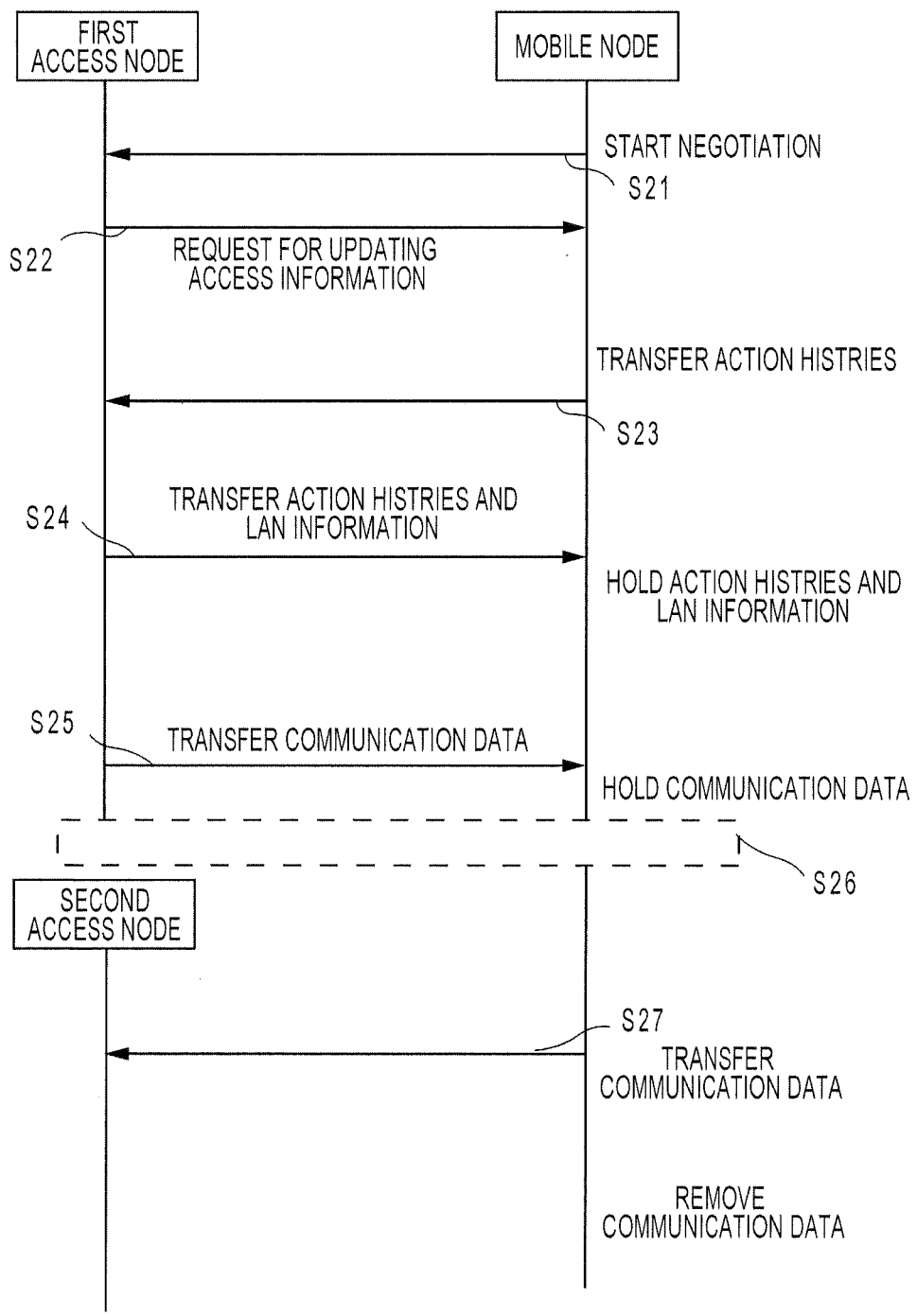
FIG. 10 is a diagram illustrating an example of a communication sequence between a mobile node and an access node, according to an embodiment.

FIG. 10 is a diagram illustrating an example of a communication sequence between a mobile node and an access node, according to an embodiment.

In sequence S21, when a forwarder enters a wireless area of a first access node, the forwarder starts negotiating with the first access node.

In sequence S22, when the first access node recognizes that the forwarder is a forwarder belonging to a DTN network according to the embodiment, that is, when the first access node determines that the identifier of the forwarder is registered in advance, the first access node requests the forwarder to update an access information item.

In sequence S23, the forwarder transfers, to the first access node, the action history of the forwarder, which serves as the access information item, and a request for obtaining a LAN information item concerning a LAN to which the first access node belongs.

In sequence S24, the first access node notifies, in accordance with the request from the forwarder, the forwarder of the action histories of all forwarders and the LAN information item concerning the LAN to which the first access node belongs. The forwarder holds the action histories of all forwarders and the LAN information item.

In sequence S25, when the first access node has communication data to be delivered to a destination node, and the forwarder is a target forwarder that is selected from the forwarder list and is to carry the communication data to the destination node, the first access node transfers the communication data to the forwarder.

In sequence S26, the forwarder holds the communication data, and moves around within an intermittent communication environment.

In sequence S27, when the forwarder becomes capable of wirelessly communicating with a second access node, the forwarder determines whether or not the second access node is an access point of a LAN to which the destination node is connected. When it is determined that the second access node is an access point of a LAN to which the destination node is connected, the forwarder transfers the communication data held thereby to the second access node. Thereafter, the forwarder removes the communication data which has been transferred to the second access node, in a fixed time period. Here, the fixed time period may be appropriately set by a designer of a system.

Figure 11:
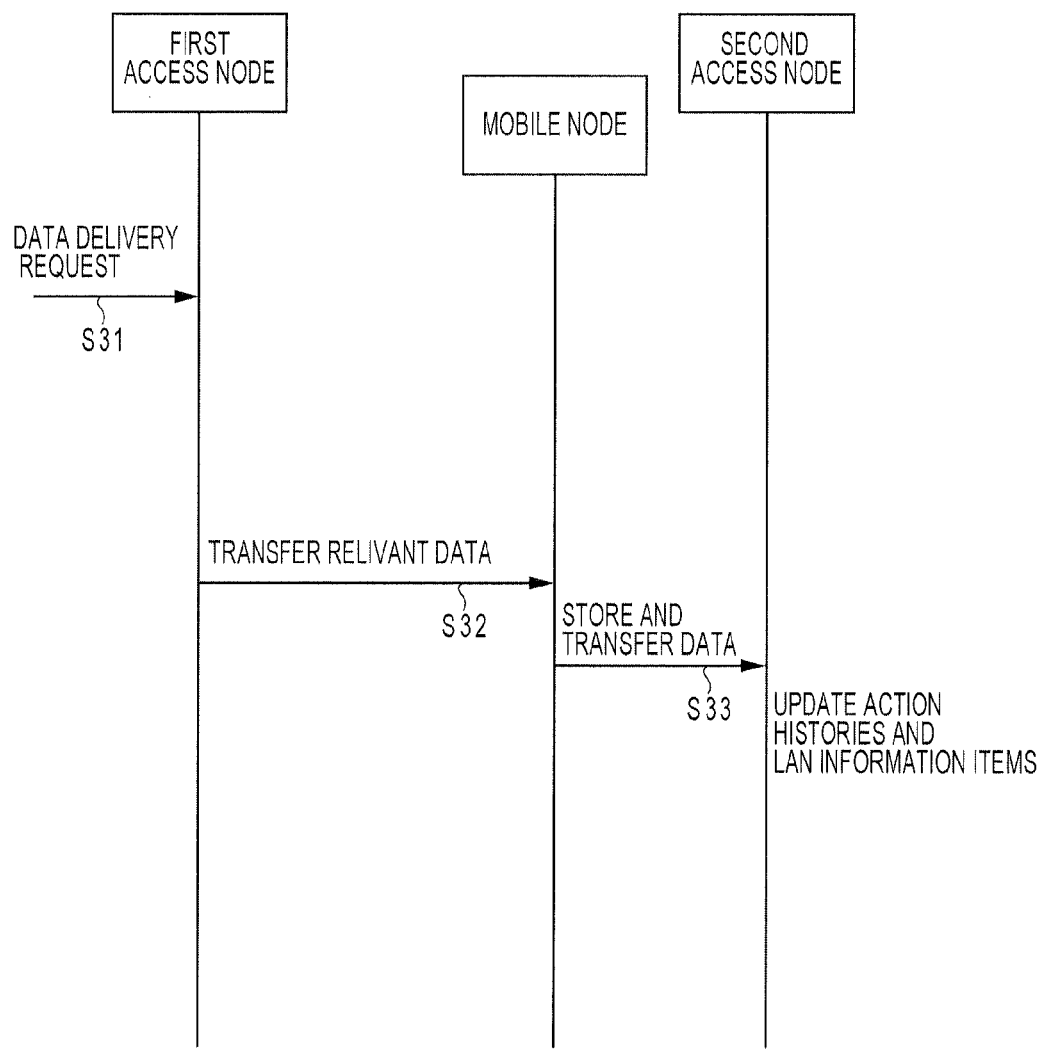
FIG. 11 is a diagram illustrating an example of a communication sequence for updating an action history of a mobile node, according to an embodiment.

FIG. 11 is a diagram illustrating an example of a communication sequence for updating an action history of a mobile node, according to an embodiment. FIG. 11 illustrates a case where relevant data is delivered from a global network to a local network.

When a request for data communication from a global network to individual local networks, such as a request to collect sensor information items, occurs, network configuration information items concerning the configurations of the individual local networks and the action histories of individual forwarders, which are stored in an integrated information management DB 11 held by the global network, are delivered together with communication data from the global network to the individual local networks. As a result, the action histories of individual forwarders held by an access point of a local network that is a communication destination are updated.

In sequence S31, when a request for delivering communication data from a first access node of the global network to the local network occurs.

In sequence S32, the first access node reads network configuration items and the action histories of forwarders from the integrated information management DB 11, adds the network configuration items and the action histories to the communication data, and transfers the communication data added with the network configuration and the action histories to the forwarder.

In sequence S33, the forwarder stores the received communication data added with the network configuration and the action histories, and moves around within an intermittent communication environment. When the forwarder approaches a second access node of the local network and, consequently, becomes capable of wirelessly communicating with the second access node of the local network, the forwarder transfers the communication data added with the network configuration and the action histories to the second access node of the local network. Then, the second access node of the local network updates, in the local information management DB 12, the action histories of all forwarders and the LAN information items of all access points. Here, although only one access node of a local network (the second access node) is depicted in FIG. 11, an operation similar to the above-described operation may be performed on all the access nodes of all local networks that the forwarder will encounter.

Figure 12:
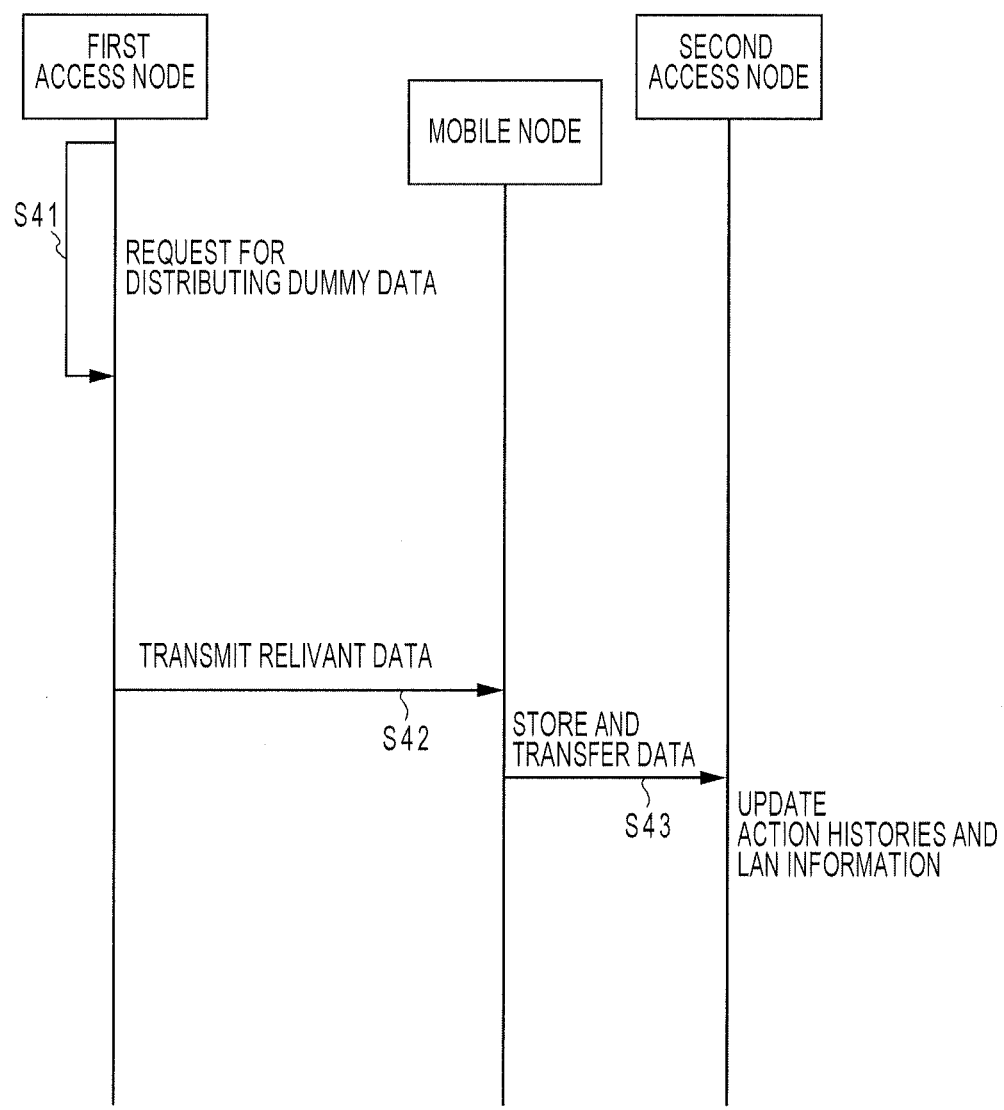
FIG. 12 is a diagram illustrating an example of a communication sequence for updating an action history of a mobile node, according to an embodiment.

FIG. 12 is a diagram illustrating an example of a communication sequence for updating an action history of a mobile node, according to an embodiment. FIG. 12 illustrates a case where an access node of a global network periodically performs distribution of information items to individual local networks.

In this case, a controller of a global network is configured to periodically communicate with individual local networks. Network configuration information items concerning the configurations of the individual local networks and the action histories of individual forwarders, which are stored in an integrated information management DB 11 held by the global network, are periodically distributed to the individual local networks, thereby allowing the action histories of individual forwarders, which are held by access points of the individual local networks, to be periodically updated.

Alternatively, the controller of the global network may be configured to non-periodically (sporadically) communicate with individual local networks, thereby allowing the action histories of individual forwarders, which are held by access points of the individual local networks, to be updated non-periodically.

In sequence S41, a first access node of the global network autonomously and periodically or non-periodically invokes a request for distributing dummy communication data to the individual local networks.

In sequence S42, the first access node reads network configuration information items and the action histories of forwarders from the integrated information management DB 11, adds the network configuration information items and the action histories to the dummy communication data, and transfers the dummy communication data added with the network configuration information items and the action histories to a forwarder that has approached the first access node of the global network.

In sequence S43, upon receiving the dummy communication data added with the network configuration information and the action histories from the first access point of the global network, the forwarder stores the relevant data (the dummy communication data added with the network configuration information and the action histories), and moves around within an intermittent communication environment. When the forwarder approaches a second access node of a local network and becomes capable of wirelessly communicating with the second access node of the local network, the second access node of the local network updates, in a local information management DB 12, the action histories of all forwarders and LAN information items of all access nodes. Although only one access node of a local network (the second access point) is depicted in FIG. 12, an operation similar to the above-described operation may be performed on access nodes of all local networks that the forwarder will encounter.

Figure 13:
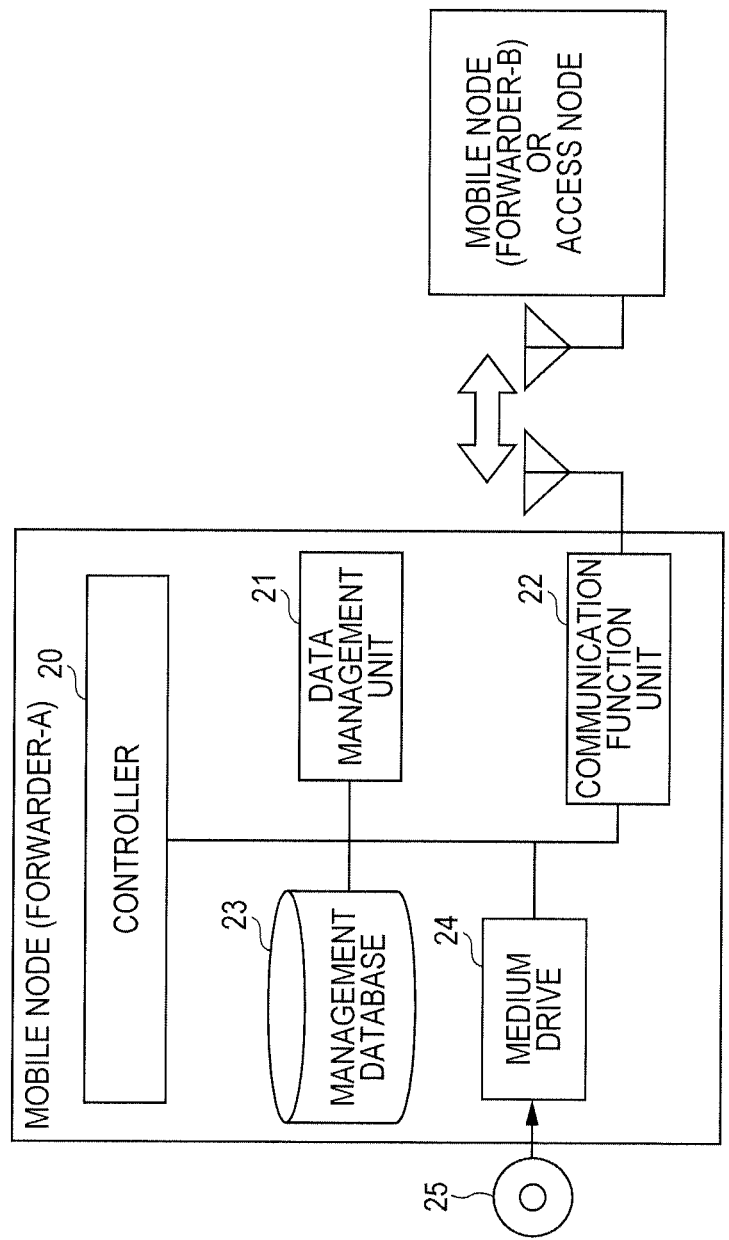
FIG. 13 is a diagram illustrating a configuration example of a mobile node, according to an embodiment.

FIG. 13 is a diagram illustrating a configuration example of a mobile node, according to an embodiment. A controller 20 may be configured to include a processor such as a central processing unit (CPU). The controller 20 may control, using the processor, a data management unit 21, a communication function unit 22, a management database 23, and a medium drive 24. The communication function unit 22 wirelessly communicates with another forwarder or an access point. The data management unit 21 stores, in the management database 23, data received by the communication function unit 22, and transmits, via the communication function unit 22, data read from the management database 23. Examples of data stored in the management database 23 include communication data, the action histories of forwarders, and network configuration information items. The controller 20 may operate, using a CPU, in accordance with a control program for performing the operations according to the embodiment. The control program may be recorded in a portable recording medium 25 such as a digital versatile disc (DVD), a compact-disc read-only memory (CD-ROM), a Blu-ray disc, a flexible disk, or an integrated circuit (IC) memory. In this case, the control program is read by the medium drive 24, and executed by the CPU.

Figure 14:
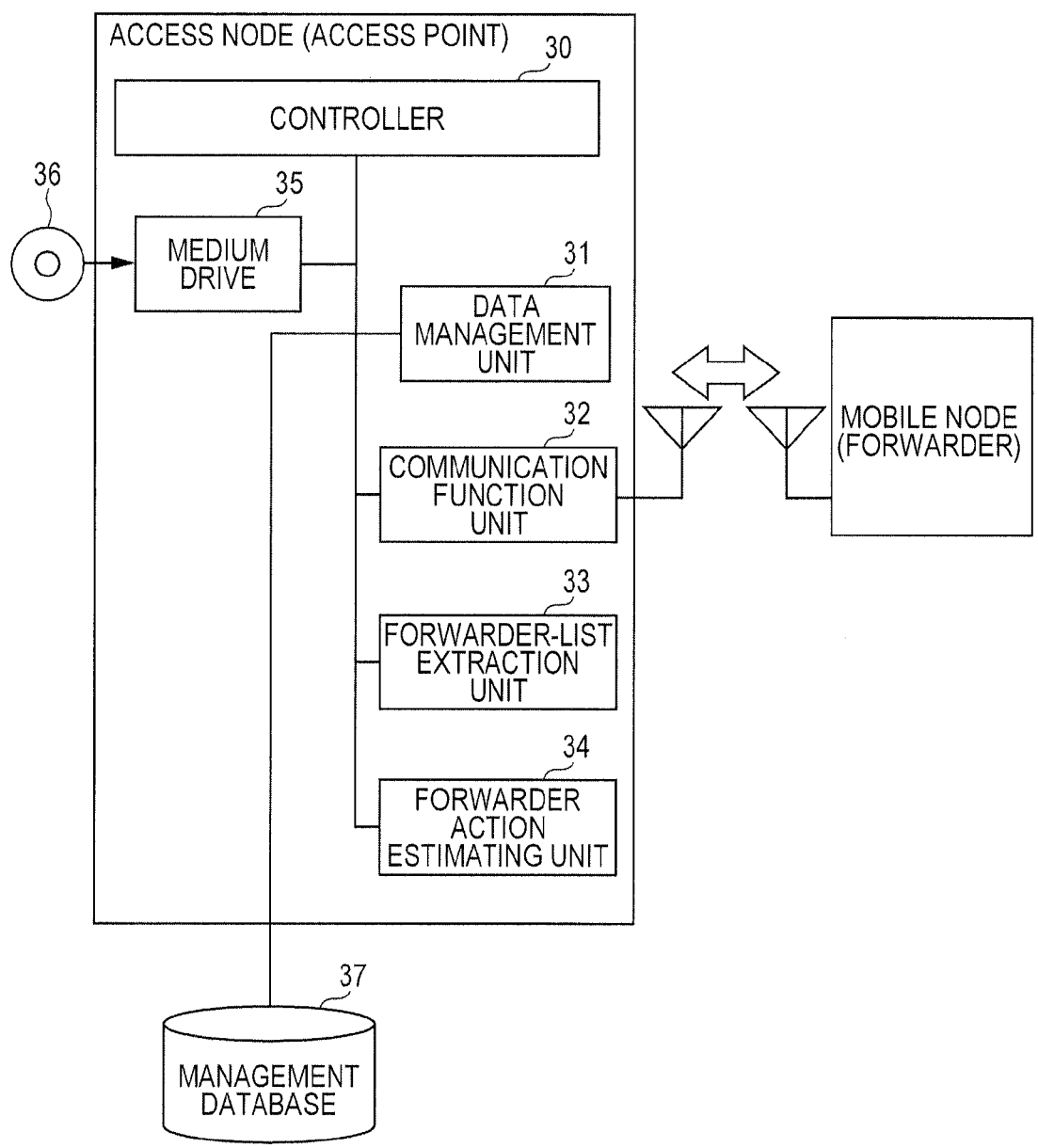
FIG. 14 is a diagram illustrating a configuration example of an access node, according to an embodiment.

FIG. 14 is a diagram illustrating a configuration example of an access node, according to an embodiment. A controller 30 may be configured to include a processor such as a central processing unit (CPU). The controller 30 may control, using the processor, a data management unit 31, a communication function unit 32, a forwarder-list extraction unit 33, a forwarder action estimating unit 34, a management database 37, and a medium drive 35. The communication function unit 32 communicates with a forwarder using a wireless channel. The data management unit 31 stores, in the management database 37, data received by the communication function unit 32, and transmits, via the communication function unit 32, data read from the management database 37. The forwarder action estimating unit 34 calculates arrival probabilities of forwarders for each communication destination by using the action histories of forwarders. The forwarder-list extraction unit 33 generates a forwarder list on the basis of the arrival probabilities calculated by the forwarder action estimating unit 34. The management database 37 may store communication data together with the action histories of forwarders and network configuration information items, which have been received from forwarders, and the forwarder list. The controller 30 may operate, using the CPU, in accordance with a control program for performing the operations according to the embodiment. The control program may be recorded in a portable recording medium 36 such as a DVD, a CD-ROM, a Blu-ray disc, a flexible disk, or an IC memory. In this case, the control program is read by the medium drive 35, and executed by the CPU.

Figure 15:
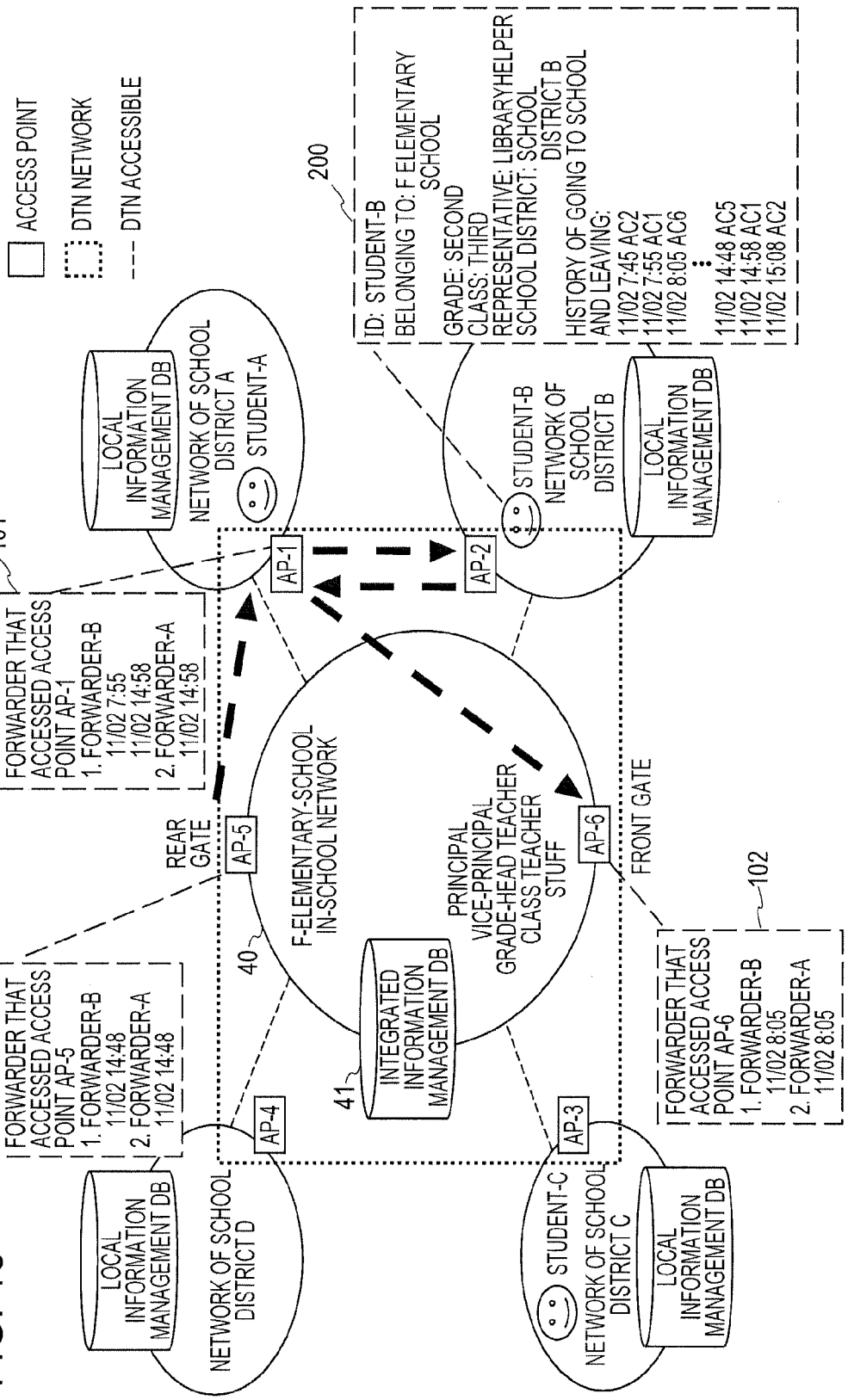
FIG. 15 is a diagram illustrating an example of a data delivery system, according to an embodiment.

FIG. 15 is a diagram illustrating an example of a data delivery system, according to an embodiment. FIG. 15 illustrates a data delivery system applied to a contact communication network for school. In FIG. 15, reference numerals 101 to 103 refer to access records, that are stored in the access points and indicate accesses made to individual access points, and reference numeral 200 refers to the action history of a student-B (a forwarder-B). FIG. 15 illustrates a state in which access records of accesses made to individual access points are accumulated in the access points and a state in which the action history of a student-B (a forwarder-B) is accumulated.

In the example of FIG. 15, the actions are made by a student-B (a forwarder-B) in the following manner: when the student-B (the forwarder-B) commuted to school, the student-B called for a student-A (a forwarder-A), in other words, the forwarder-B accessed an access point AP-1; the student-B and the student-A attended the school together through a front gate, in other words, the forwarder-A and the forwarder-B accessed an access point AP-6; the student-B and the student-A left the school through a rear gate, in other words, the forwarder-B and the forwarder-A accessed an access point AP-5; and the student-B said good-by to the student-A and returned home, in other words, the forwarder-A accessed the access point AP-2.

The action history held by the student-B (the forwarder-B), and access records of forwarders and LAN information items, which are held by access points of networks of individual school districts, are stored in an integrated information management DB 41 included in an F-elementary-school in-school network 40. The access points AP-5 and AP-6 included in the F-elementary-school in-school network 40 distribute the action histories of individual forwarders and LAN information items concerning LANs of the individual school districts, which are stored in the integrated information management DB 41, to access points of the individual school districts at arbitrary timing. As a result, information items may be shared by the individual school districts. This allows a forwarder having high arrival probabilities to be selected as a target forwarder that carries communication data to a destination node when performing DTN communication from the individual school districts to the F-elementary-school in-school network 40 or when performing DTN communication among the individual school districts.

In this case, it is possible that data and a forwarder list are transferred, by means of DTN communication, among only forwarders having a network attribute of an F elementary school (i.e., students/staff members, parents thereof, and so forth of the F elementary school). This allows communication from the networks of the individual school districts to the F-elementary-school in-school network to be realized by limiting the area of communication.

In this case, the area of a DTN network is a neighboring region, and it is considered that the networks of the individual school districts and the F-elementary-school in-school network are connectable to the Internet. A DTN communication network using a forwarder selection scheme according to the embodiment allows forming a closed network applied to only areas that are both spatially and temporally closed.

For example, it is possible to provide each of the networks of the individual school districts with a network attribute indicating that the each network belongs to a specific network. This allows data to be transferred among local networks that are not connected to a global network and are positioned at multiple locations. In other words, closed networks may be formed by separating the networks from the global network. By taking the network attribute into account, a forwarder may be prevented from transferring data from/to other networks, and may avoid occurrence of leakage of information items to outsiders. In this way, the security may be maintained.

For example, when a network attribute is provided for the district of the F elementary school while another network attribute is provided for the school district of a G elementary school, the forwarders belonging to the individual school districts may transfer data, in accordance with the individual network attributes provided for the respective school districts, without mixing information items concerning the F elementary school and information items concerning the G elementary school. Thus, occurrence of leakage of personal information items may be prevented.

By employing the a forwarder selection scheme according to the embodiment, forwarders having high arrival probabilities of delivering data to a target network may be selected as target forwarders that carry communication data, on the basis of the action histories of forwarders. Accordingly, data may be delivered to the communication destinations with efficiency much higher than that of an epidemic routing scheme of the related art. This prevents a forwarder from holding a large amount of data having a least-likely possibility of arriving at the target network (or unnecessary data). As a result, the forwarders may transfer a large amount of effective communication data using DTN communication, thereby increasing the data capacity of DTN communication performed in an entire network.

Further, even when there exist no specific forwarders that are making the rounds of a set of fixed nodes as in the message ferry routing scheme, an available forwarder (that is able to deliver data to a target communication partner) may be selected, thereby increasing a communication area of DTN communication.

As mentioned above, for example, sensor information items provided by sensors included in sensor networks that are physically separated from one another may be integrated and managed. Further, closed networks in which the security is maintained may be formed by selecting forwarders in accordance with a certain rule.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system to deliver data in an intermittent communication environment, the system comprising:
   a plurality of mobile nodes each allowed to move around within the intermittent communication environment; and
   a plurality of access nodes each connected to one of a plurality of networks; and
   an integrated information management database included in one of the plurality of networks, wherein
   each of the plurality of access nodes is configured to:
      wirelessly communicate with one of the plurality of access nodes and the plurality of mobile nodes upon approach to any node, and
      store communication data to be delivered to a destination node included in one of the plurality of networks;
   each of the plurality of access nodes is configured to:
      store an action history in association with each of the plurality of mobile nodes, the action history including evaluation information on past transfer of communication data between a mobile node and the plurality of access nodes,
      generate a forwarder list in association with the destination node, based on action histories of the plurality of mobile nodes, the forwarder list storing one or more forwarder identifiers each identifying a first mobile node, the forward identifiers arranged in an order of an arrival probability indicating a probability that the first mobile node succeeds in delivering the communication data to the destination node, select one or more second mobile nodes that are to carry the communication data to the destination node, based on the forwarder list,
      transfer the communication data to one of the one or more second mobile nodes when a communication link is established between each access node and the one of the one or more second mobile nodes so that the communication data is delivered to the destination node via the one of the one or more second mobile nodes,
   the action histories of the plurality of mobile nodes are managed by the integrated information management database; and
   the action histories managed by the integrated information management database are synchronized, via the plurality of mobile nodes, with the action histories stored in the plurality of access nodes.

2. The system of claim 1, wherein
the action history of each mobile node includes an accessed network identifier identifying one of the plurality of networks that is connected to an access node with which each mobile node communicated, a forwarder identifier identifying each mobile node, and the number of accesses made to the access node connected to the one of the plurality of networks.

3. The system of claim 2, wherein
the action history of each mobile node is recorded in the access node when each mobile node communicates with the access node connected to the one of the plurality of networks.

4. The system of claim 1, wherein
the integrated information management database stores, as a portion of the action history, network configuration information for each of the plurality of networks.

5. The system of claim 1, wherein
the plurality of networks includes the Internet and a sensor network to which one or more sensors are connected.

6. The system of claim 1, wherein
the arrival probability of the first mobile node is determined to be a ratio of the number of times the first mobile node succeeded in delivering the communication data to the destination access node during a given time period, to the number of times the first mobile node received the communication data during the given time period.

7. A method to deliver data in an intermittent communication environment including a plurality of access nodes each connected to one of a plurality of networks and a plurality of mobile nodes each allowed to move around within the intermittent communication environment, the method being performed by each access node, the method comprising:
   wirelessly communicating with any one of the plurality of mobile nodes upon approaching any one of the plurality of mobile nodes;
   storing an action history in association with each of the plurality of mobile nodes, the action history including evaluation information on past transfer of communication data between a mobile node and the plurality of access nodes;
   generating a forwarder list in association with a destination node to which communication data is to be delivered, based on action histories of the plurality of mobile nodes, the forwarder list storing one or more forwarder identifiers each identifying a first mobile node, in an order of an arrival probability indicating a probability that the first mobile node succeeds in delivering the communication data to the destination node;
   selecting one or more second mobile nodes that are to carry the communication data to the destination node, based on the generated forwarder list; and
   transferring the communication data to one of the one or more second mobile nodes when a communication link is established between each access node and the one of the one or more second mobile nodes so that the communication data is delivered to the destination node via the one of the one or more second mobile nodes, wherein
   the action histories of the plurality of mobile nodes are managed by an integrated information management database included in one of the plurality of networks; and
   the action histories managed by the integrated information management database are synchronized, via the plurality of mobile nodes, with the action histories stored in the plurality of access nodes.

8. A computer-readable, non-transitory medium storing instructions for allowing a computer system to execute a procedure to deliver data in an intermittent communication environment including a plurality of mobile nodes each allowed to move around within the intermittent communication environment and a plurality of access nodes each connected to one of a plurality of networks, the procedure comprising:
   wirelessly communicating with any one of the plurality of mobile nodes upon approaching any one of the plurality of mobile nodes;
   storing an action history in association with each of the plurality of mobile nodes, the action history including evaluation information on past transfer of communication data between a mobile node and the plurality of access nodes;
   generating a forwarder list in association with a destination node to which communication data is to be delivered, based on action histories of the plurality of mobile nodes, the forwarder list storing one or more forwarder identifiers each identifying a first mobile node, in an order of an arrival probability indicating a probability that the first mobile node succeeds in delivering the communication data to the destination node;

selecting one or more second mobile nodes that are to carry the communication data to the destination node, based on the generated forwarder list; and transferring the communication data to one of the one or more second mobile nodes when a communication link is established between each access node and the one of the one or more second mobile nodes so that the communication data is delivered to the destination node via the one of the one or more second mobile nodes, and wherein the action histories of the plurality of mobile nodes are managed by an integrated information management database included in one of the plurality of networks; and the action histories managed by the integrated information management database are synchronized, via the plurality of mobile nodes, with the action histories stored in the plurality of access nodes.

\* \* \* \* \*